United States Patent

Reid

[15] 3,643,911
[45] Feb. 22, 1972

[54] PLASTIC MOLDING APPARATUS
[72] Inventor: Glenn J. Reid, Bloomfield Hills, Mich.
[73] Assignee: Williams Products, Inc., Troy, Mich.
[22] Filed: Aug. 24, 1970
[21] Appl. No.: 66,401

[52] U.S. Cl. ...........................249/170, 249/112, 18/DIG. 4, 18/5 P, 249/163
[51] Int. Cl. .........................................B29c 7/00, B29c 5/00
[58] Field of Search.................249/160, 161, 162, 170, 171, 249/172, 50, 112, 163, 164; 18/DIG. 4

[56] References Cited

UNITED STATES PATENTS

| | | | |
|---|---|---|---|
| 3,010,174 | 11/1961 | McCall | 249/50 |
| 3,084,390 | 4/1963 | Anderson | 18/DIG. 4 |
| 3,353,220 | 11/1967 | Lenoble | 18/DIG. 4 |

*Primary Examiner*—J. Howard Flint, Jr.
*Attorney*—Harness, Dickey & Pierce

[57] ABSTRACT

A mold assembly for use in molding foam plastic products such as simulated beams. The assembly includes a rubber mold liner and a steel jacket or carrier in which the liner is confined. The carrier is hinged so that opposite sides of the liner can be inclined away from one another to facilitate the removal of the molded product from the liner.

7 Claims, 4 Drawing Figures

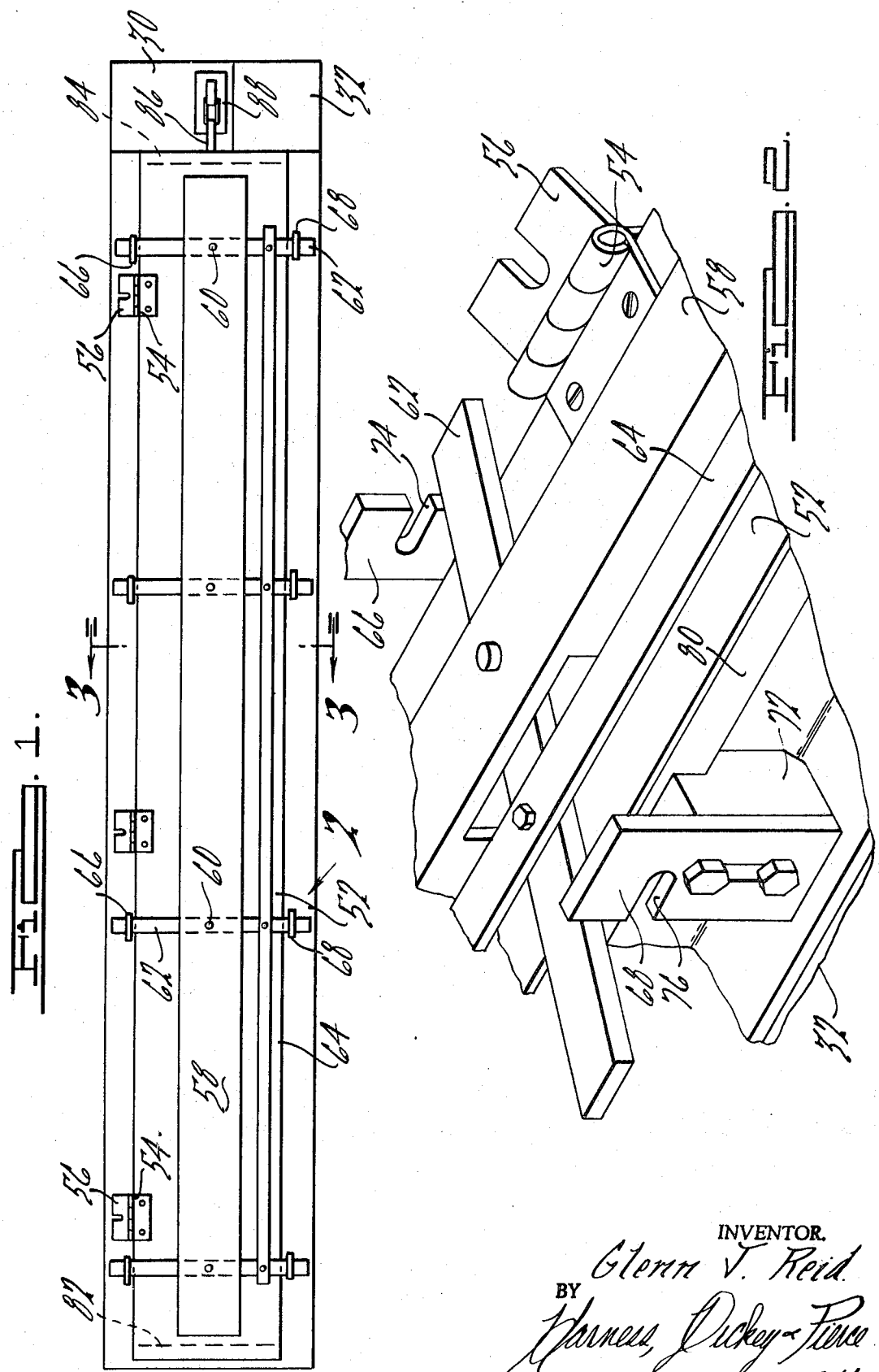

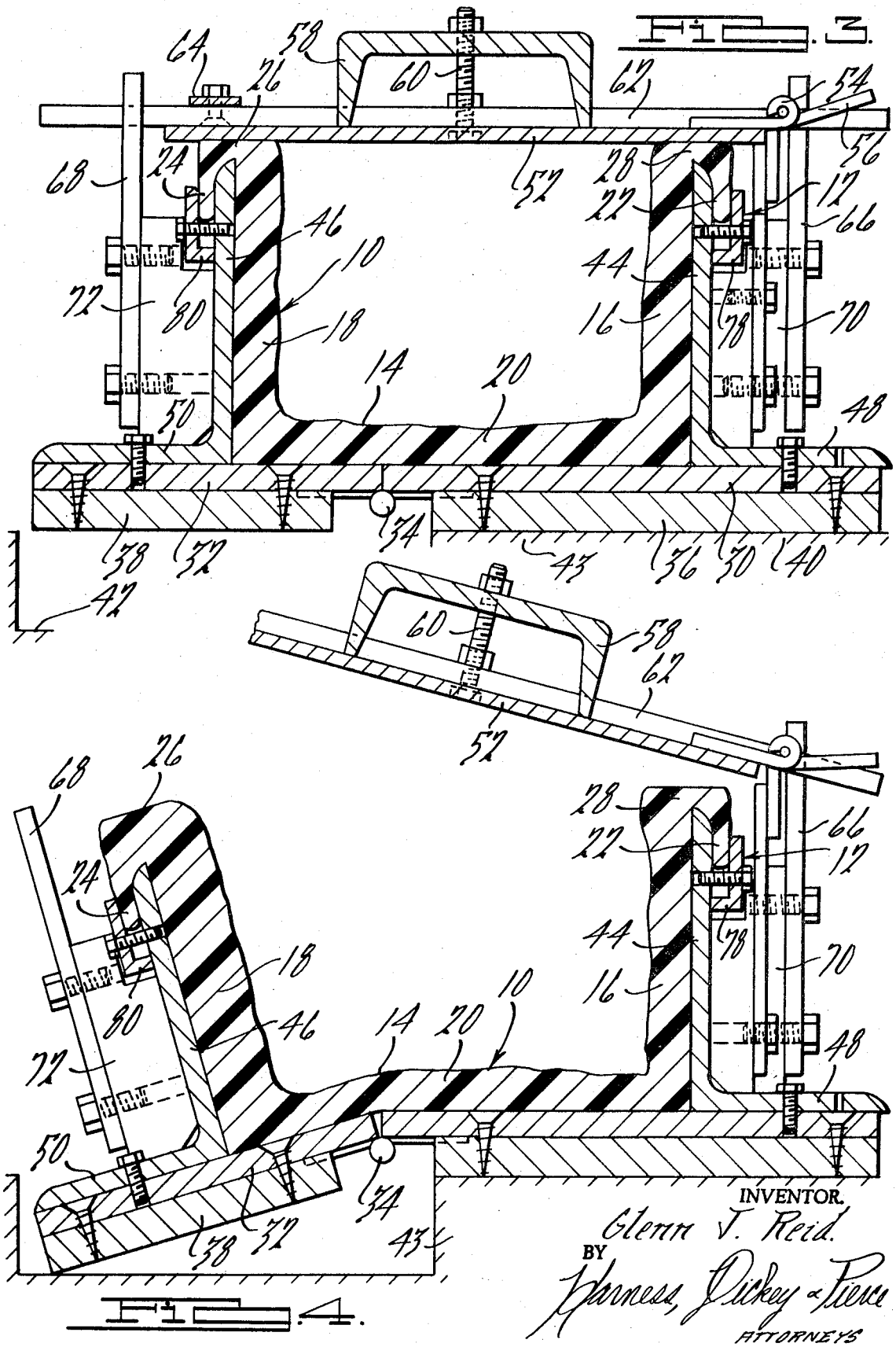

PLASTIC MOLDING APPARATUS

SUMMARY OF THE INVENTION

This invention relates to a plastic molding apparatus and particularly to a mold assembly for use in forming foam plastic articles.

It is an object of the present invention to provide a mold assembly which is inexpensive of manufacture, which is versatile in use and which can be utilized with a number of different mold liners, which facilitates the convenient removal of the product from the mold, which possesses a long useful life and which can be readily modified for molding of articles of different length.

DESCRIPTION OF THE DRAWINGS

FIG. 1 is a plan view of a mold assembly made in accordance with the present invention;

FIG. 2 is a perspective view of the structure illustrated in FIG. 1 looking in the direction of the arrow 2 of FIG. 1;

FIG. 3 is an enlarged sectional view of the structure illustrated in FIG. 1 taken along the line 3—3 thereof; and FIG. 4 is a view of the structure illustrated in FIG. 3 but with the mold assembly shown in the open position.

DESCRIPTION OF THE PREFERRED EMBODIMENT

Referring now to the drawings it will be seen that the mold assembly of the present invention is made in generally two parts: a mold liner 10 and a carrier or jacket 12. The mold liner 10 is molded from rubber or other elastomeric material and defines three sides of a cavity 14 having the outer shape of the object to be molded. The liner 10 is of generally U-shaped cross section and is provided with opposite sidewalls 16 and 18 connected by a bottom wall 20. The upper ends of the sidewalls 16 and 18 are formed with downwardly extending lips 22 and 24 which are spaced outwardly and away from the sidewalls 16 and 18, respectively, and are connected to the sidewalls 16 and 18 by upper walls 26 and 28 respectively.

The mold liner 10 sits within and is confined by the carrier 12. The carrier 12 includes first and second bottom walls 30 and 32 which are joined by a hinge 34. During the actual molding of the part the bottom walls 30 and 32 are disposed in coplanar relation and function as one continuous bottom wall. It can be seen that the bottom wall 30 sits on a wooden base 36 while the bottom wall 32 sits on a wooden base 38. The mold carrier 12 is illustrated in FIGS. 3 and 4 as resting on a supporting surface 43 of stepped configuration which is utilized during the removal of the molded part from the liner 10. The supporting surface includes a raised portion 40 and a recess 42. The bottom of recess 42 is spaced beneath the bottom wall 32 and its base member 38 to accommodate the downward pivotal movement of the bottom wall 32.

Referring in particular to FIGS. 3 and 4, it will be seen that the mold carrier 12 includes a first sidewall 44 and a second sidewall 46. The first sidewall 44 has a flange 48 by which it is fastened to the bottom wall 30 and the second sidewall 46 has a flange 50 by which it is fastened to the bottom wall 32. The sidewalls 44 and 46 are disposed parallel to one another and perpendicular to their respective bottom walls 30 and 32. The spacings between the sidewalls 44 and 46 is equal to the spacing between the outer surfaces of the liner sidewalls 16 and 18. Accordingly, the carrier sidewalls 44 and 46 conformably reinforce and support the liner sidewalls 18 and 16 respectively.

The upper end of the mold cavity 14 is closed by a top wall 52 which is pivotally connected to the sidewall 44 by a pair of hinges 54. The hinges 54 have flanges 56 to support the top wall in an open position in the desired attitude. The top wall 52 is designed to close against the upper walls 26 and 28 of the mold liner 10 thereby closing the mold cavity 14. The top wall 52 is supported and reinforced by a downwardly facing channel member 58. A plurality of threaded pivot pins 60 extend between the top of the channel member 58 and the top wall 52 and serve to pivotally support thereon a plurality of latches 62.

The latches 62 lie flatly against the upper surface of the top wall 52 and extend beyond the opposite sides of the top wall 52. The latches 52 are pivotally connected to one another by means of a link 64. Thus, when one of the latches is pivoted all of them are pivoted.

The opposite ends of each of the latches 62 are engageable with latch plates 66 and 68 arranged on the opposite sides of the carrier 12. The latch plates 66 and 68 are fastened to blocks 70 and 72 welded to the sidewalls 44 and 46, respectively. It can be seen that the latch plates 66 and 68 are provided with latch slots 74 and 76 to receive the opposite ends of the latches 62. The slots 74 and 76 face in opposite directions so that upon pivotal movement of the latches 62 in one direction the latches can either be removed from or inserted into both of the slots 74 and 76. The latches 62 serve two purposes: they hold the top wall 72 down on the mold liner 10 to enclose the cavity 14 and they hold the walls 16 and 18 of the mold in parallel relation. In other words the latch 62 fix the positions of both the hinge 34 and the hinge 54.

The mold liner 10 tends to remain within the carrier 12 simply by virtue of its general shape and gravity. However, positive means for retaining the opposite sidewalls 16 and 18 against the walls 44 and 46 is provided by a pair of clamps 78 and 80. The clamp 78 secures the lip 22 against the outer surface of the wall 44 while the clamp 80 secures the lip 24 against the outer surface of the wall 46.

The structure thus far described serves to confine the mold liner 10 on four sides. The opposite ends of the part to be formed within the cavity 14 are formed by end walls 82 and 84. The end wall 82 is fixed in position and is secured to the bottom wall 30 adjacent one end thereof. The end wall 84, on the other hand, is carried on a toggle mechanism 86 positioned on an adjustable base 88. When the mold is opened, the toggle mechanism 86 is released to relieve endwise pressure on the part to be formed.

The use of the device of the present invention will be fairly obvious to those familiar with the molding of foam plastic products. The foam reaction mixture is placed within the cavity 14 and the latches 62 are closed to provide a confined space within which the foam reaction mixture may expand. After the lapse of a suitable time the latches 62 are opened and the bottom wall 32 is pressed downwardly to break the sidewall 18 away from the part. The toggle mechanism 86 is also released. The part which is molded may then be lifted out of the mold. For this purpose, the top wall 52 is pivoted to a fully opened position in which the flange 56 abuts the vertical portion of the hinge 54. It will be apparent that various liners 10 may be used with the carrier 12. When the liner 10 has become sufficiently worn that it is no longer serviceable a new liner may be readily inserted in place of the worn liner. Furthermore, it will be obvious that the cavity 14 is easily plugged with a filler of any desired length at either end so that parts may be formed of any desired length. It will be obvious that the parts are not finished at their opposite ends. The mold apparatus illustrated herein is intended particularly for use in forming simulated wooden beams. Such beams are intended to be sawed to a desired length and are covered at their opposite ends. Accordingly, the part is finished only on three sides, that is, the sides defined by the mold liner wall 16, 18 and 20.

What is claimed is:

1. A molding apparatus including an elastomeric mold liner having a pair of parallel spaced sidewalls and a bottom wall connecting said sidewalls, said liner being open at its top, and a rigid carrier for said liner having a bottom wall engaging said liner bottom wall, said carrier bottom wall having first and second portions hinged together for movement between a closed position in which said bottom wall portions are parallel and an open position in which said mold sidewalls are disposed at an angle to one another.

2. The structure set forth in claim 1 wherein said carrier is provided with a hinged top operable to close the space between said liner sidewalls at the upper end thereof.

3. The structure set forth in claim 1 including end walls operable to close the space between said liner sidewalls at the opposite ends thereof, at least one of said end walls being longitudinally movable with respect to said liner sidewalls.

4. The structure set forth in claim 2 including latch means operable to lock said top with respect to said carrier sidewalls.

5. The structure set forth in claim 1 including lips on said liner sidewalls lying on the outer sides of said carrier sidewalls and clamps for securing said lips to said carrier sidewalls.

6. The structure set forth in claim 2 including a plurality of latches pivoted to said top and latch plates on the opposite sides of said carrier having slots for receiving said latches and thereby holding said top closed.

7. The structure set forth in claim 6 including a link pivotally connecting said latches.

* * * * *